United States Patent [19]

Haldeman

[11] Patent Number: 4,556,101
[45] Date of Patent: Dec. 3, 1985

[54] WAVY TUBE HEAT PUMPING

[75] Inventor: Charles W. Haldeman, Concord, Mass.

[73] Assignee: Megatech Corporation, Billerica, Mass.

[21] Appl. No.: 486,250

[22] Filed: Apr. 18, 1983

Related U.S. Application Data

[63] Continuation-in-part of Ser. No. 248,964, Mar. 30, 1981, abandoned, which is a continuation-in-part of Ser. No. 948,760, Oct. 5, 1978, abandoned.

[51] Int. Cl.$^4$ ............................................. F28D 15/00
[52] U.S. Cl. ....................................... 165/45; 165/163; 60/641.2; 62/260
[58] Field of Search .................. 165/45, 163; 60/641.2; 62/260

[56] References Cited

U.S. PATENT DOCUMENTS

| | | | |
|---|---|---|---|
| 2,031,551 | 2/1936 | Sorensen | 165/163 |
| 4,042,012 | 8/1977 | Perry et al. | 165/45 |
| 4,089,373 | 5/1978 | Reynolds et al. | 165/45 |
| 4,094,356 | 6/1978 | Ash et al. | 165/45 |
| 4,375,831 | 3/1983 | Downing | 165/45 |
| 4,388,966 | 6/1983 | Spiegel | 165/45 |

FOREIGN PATENT DOCUMENTS

| | | | |
|---|---|---|---|
| 161938 | 7/1905 | Fed. Rep. of Germany | 165/45 |
| 2535075 | 2/1977 | Fed. Rep. of Germany | 165/163 |
| 552499 | 5/1923 | France | 165/163 |
| 621822 | 5/1927 | France | 165/163 |
| 394864 | 10/1931 | United Kingdom | 165/163 |
| 399709 | 2/1974 | U.S.S.R. | 165/163 |

Primary Examiner—William R. Cline
Assistant Examiner—John J. McGlew, Jr.
Attorney, Agent, or Firm—Charles Hieken

[57] ABSTRACT

A PVC conduit about 4" in diameter and a little more than 40 feet long is adapted for being seated in a hole in the earth and surrounds a coaxial copper tube along its length that carries Freon between a heat pump and a distributor at the bottom. A number of wavy conducting tubes located between the central conducting tube and the wall of the conduit interconnect the distributor with a Freon distributor at the top arranged for connection to the heat pump. The wavy conducting tubing is made by passing straight soft copper tubing between a pair of like opposed meshing gears each having four convex points in space quadrature separated by four convex recesses with the radius of curvature of each point slightly less than that of each concave recess.

4 Claims, 7 Drawing Figures

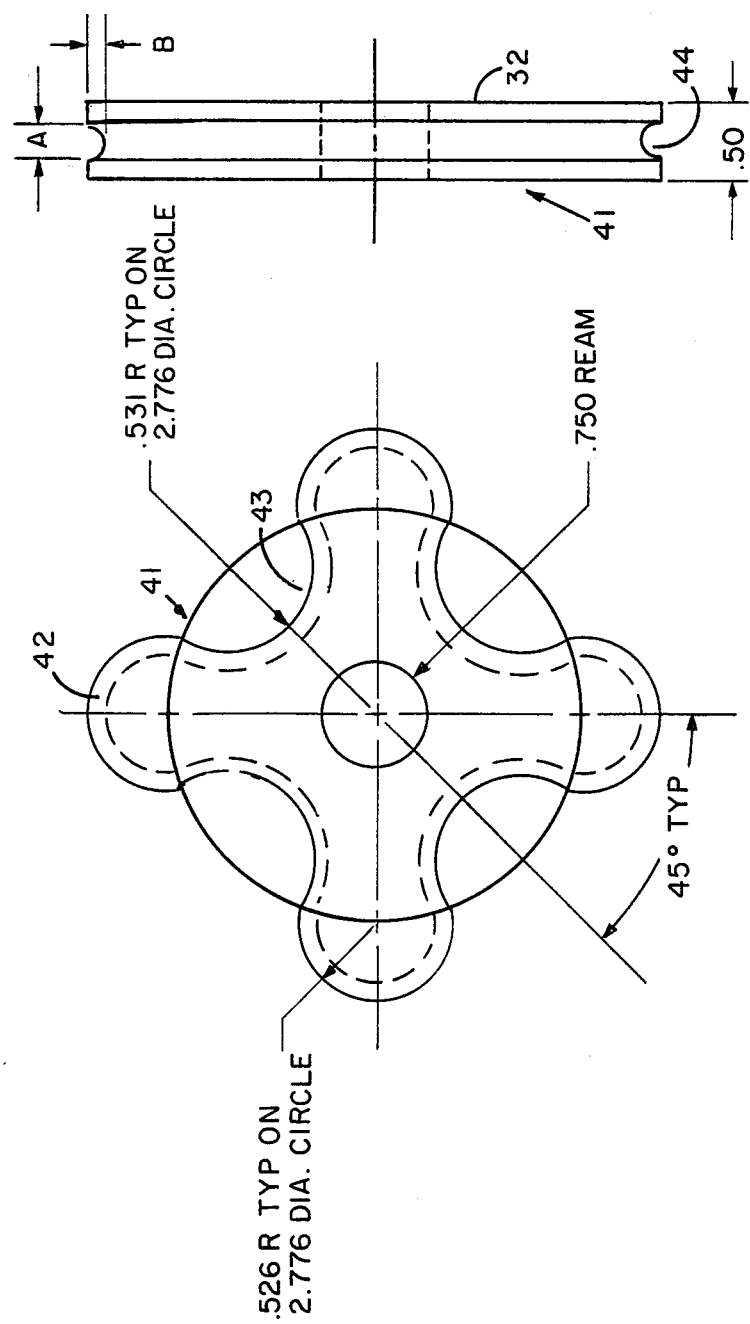

WAVY TUBE HEAT PUMPING

The present invention represents an improvement of the invention disclosed in application Ser. No. 248,964 filed Mar. 30, 1981, now abandoned, which is a continuation-in-part of application Ser. No. 948,760 filed Oct. 5, 1978, now abandoned.

The present invention relates in general to geothermal heat transfer and more particularly concerns novel apparatus and techniques for efficiently exchanging heat with the earth to provide both heating and cooling in a cost effective heat pump system that uses wavy tubes for exchanging heat.

A search of subclass 260 in class 62 and subclasses 45 and 163 in class 165 uncovered U.S. Pat. Nos. 1,875,305, 2,554,661, 3,848,427, 3,965,694, 4,106,555, 4,224,805, 4,325,228, 4,327,560, 4,328,858, Japanese patent documents 55-165434 and 56-53330, and German patent documents Nos. 29 30 484 and 29 31 485.

A prior invention owned by the assignee of this application takes advantage of ground Freon heat exchangers for use with conventional refrigeration heat pumps for space heating having the advantage over air heat exchangers that the temperature in the ground is significantly closer to the desired room temperature than the outside air temperature. Ground temperature is typically within the range of 40° to 60° F. whereas outside air temperatures are typically within the range 0° to 100° F. As a result, a heat pump operating from ground temperature has a smaller temperature difference to work against and avoids noisy outside air movers or outside water source and drainage systems.

The prior invention maintains continuous fluid contact with ground water in a hole drilled in the earth, which in turn exchanges heat with the earth. A Freon-water heat exchanger is lowered into the upper end of the drilled hole, typically six-inches in diameter. Typically a 40-foot long heat exchanger is located approximately 20 feet below ground level or ten feet below the natural water level. If the well does not fill naturally, it may be filled from another source. A convective duct below the heat exchanger draws water from the bottom of the well, typically 500 feet deep for a 60,000 BTU/hr. heat exchanging system. A motor driven propeller mounted at the top of the heat exchanger helps circulate the ground water. Typically a half-horsepower submersible pump motor drives the propeller to move approximately 100 gallons of water per minute through the heat exchanger. Typically the structure is long and thin and may comprise eight parallel enhanced-area tubes finned on the inside and knurled on the outside available from Noranda Metal Industries, the Forge-Fin division, Prospect Drive, Newton, Conn.

This prior invention has a number of advantages over conventional water source heat pumps which remove water from the well with a pump under pressures of 50 to 100 pounds per square inch. Power consumption is lower because pressure drop in the hole is only that needed to circulate the water in the hole, typically two to five pounds per square inch. Heat transfer between the earth and heat exchanger are accomplished by the same stream of water, typically about 100 gallons per minute without removing water from or returning water to the earth. Piping losses are minimized because Freon, or other fluorocarbon refrigerant, is piped only to the top 40 feet of the well with water at nearly constant pressure carrying the heat to the bottom of the 500-foot deep hole.

It is an important object of this invention to provide an improvement over the prior invention described above.

According to the invention, in a heat exchanger having a number of Freon-carrying tubes for exchanging heat with surrounding water, the improvement resides in the tubes being wavy. According to the method of making the tubes, conventional soft copper tubing enters through two rotating gears having a shape that forms the wavy tubes. Preferably additional multitooth gears coact with the first-mentioned rotating gears to cause the latter to rotate uniformly.

Numerous other features, objects and advantages of the invention will become apparent from the following specification when read in connection with the accompanying drawing in which:

FIGS. 3A and 3B show plan and end views, respectively, of a gear for bending soft copper tubing to make the wavy tubing;

Figure 1:
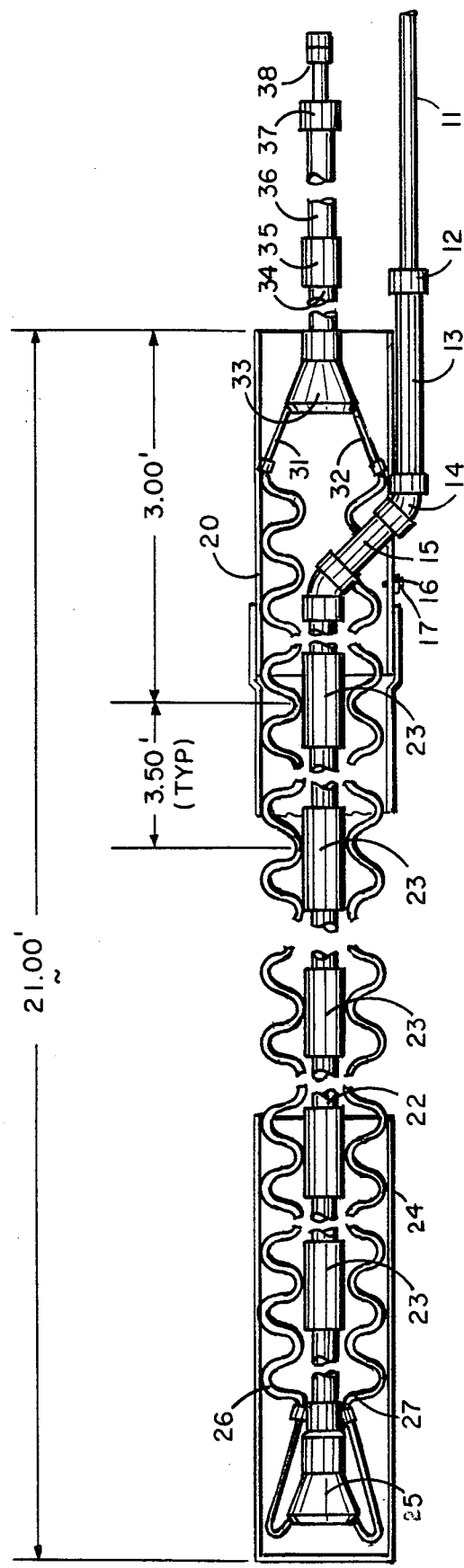
FIG. 1 shows an improved heat exchanger with wavy tubes according to the invention.
Figure 2:
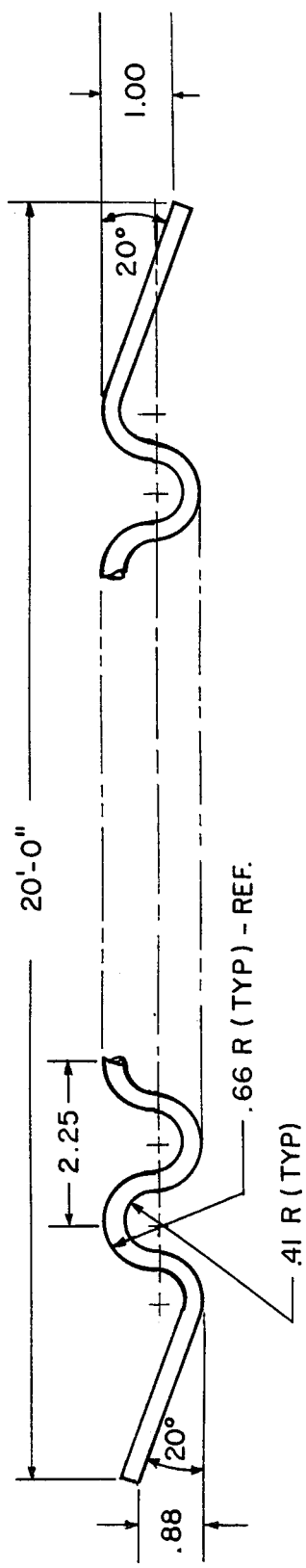
FIG. 2 is a cutaway plan view of a wavy tube according to the invention.

With reference now to the drawing, and more particularly, FIG. 1 thereof, there is shown an embodiment of the invention using wavy tubes for insertion into a hole in the ground. A copper tube 11, typically $\frac{1}{2}'' \times 14''$ is used for evacuating and purging the assembly, the heat pump piping being typically $\frac{7}{8}''$ diameter or larger for connection to the service heat pump of 60,000 BTU capacity. This connection is made to copper tube 13, typically $\frac{7}{8}'' \times 12''$ coupled by 45° copper elbow 14 to copper tube 15, typically, $\frac{7}{8}'' \times 3\frac{1}{2}''$ copper tube. Copper tube 15 passes through an opening just above collar strap 16 secured by self-tapping screw 17 into PVC collar 20. Another 45° elbow 21 couples copper tube 15 to vertical copper tube 22, typically $\frac{7}{8}'' \times 20'$ surrounded by five copper spacers 23, typically $1\frac{5}{8}'' \times 3''$. Copper tube 22 is coaxial about and inside carlon PVC conduit 24, typically comprising two nesting sections each $4'' \times 10'$. Tube 22 is connected at the bottom to distributor assembly 25 that receives a number of wavy copper tubes, such as 26 and 27, there typically being 15 in an assembly, for carrying Freon that surround pipe 22 inside conduit 24 and are connected at the top to copper tubes, such as 31 and 32, respectively, in Freon distributor 33. Freon distributor 33 is coupled by a copper tube 12, typically $1\frac{1}{8}'' \times 3\frac{1}{2}'$, copper coupler 35, to copper tube 36, typically $1\frac{1}{8}'' \times 12''$. Modified cap 37 through access valve 38 are connected to Freon tank and gauges for refilling with Freon after purging the assembly. Access valve 38, cap 37 and copper tube 11 are then cut off and tubes 13 and 36 are connected to a conventional heat pump. Each of the wavy copper tubes may be made from $\frac{1}{4}''$ outer diameter soft copper tubing dimensioned typically as shown in FIG. 2. For certain applications it may be desirable to use other size tubes, such as $\frac{1}{8}''$, $\frac{3}{8}''$ and other sizes depending on the capacity of the system.

Referring to FIGS. 3A and 3B, there are shown plan and end views, respectively, of a suitable gear for coacting with a like meshing gear for forming the wavy copper tubing. Gear 32 typically comprises four teeth in space quadrature of convex arcuate profile, such as 42, separated by concave segments, such as 43, also of arcuate profile, for being opposed by a convex tooth of the mating gear. Groove 44 is typically of width 0.25" and depth 0.122" for ¼" tubing and 0.312" and 0.153", respectively, for 5/16" tubing. The depths are 0.003" less than the tube radius to provide squeeze.

Figure 4A:
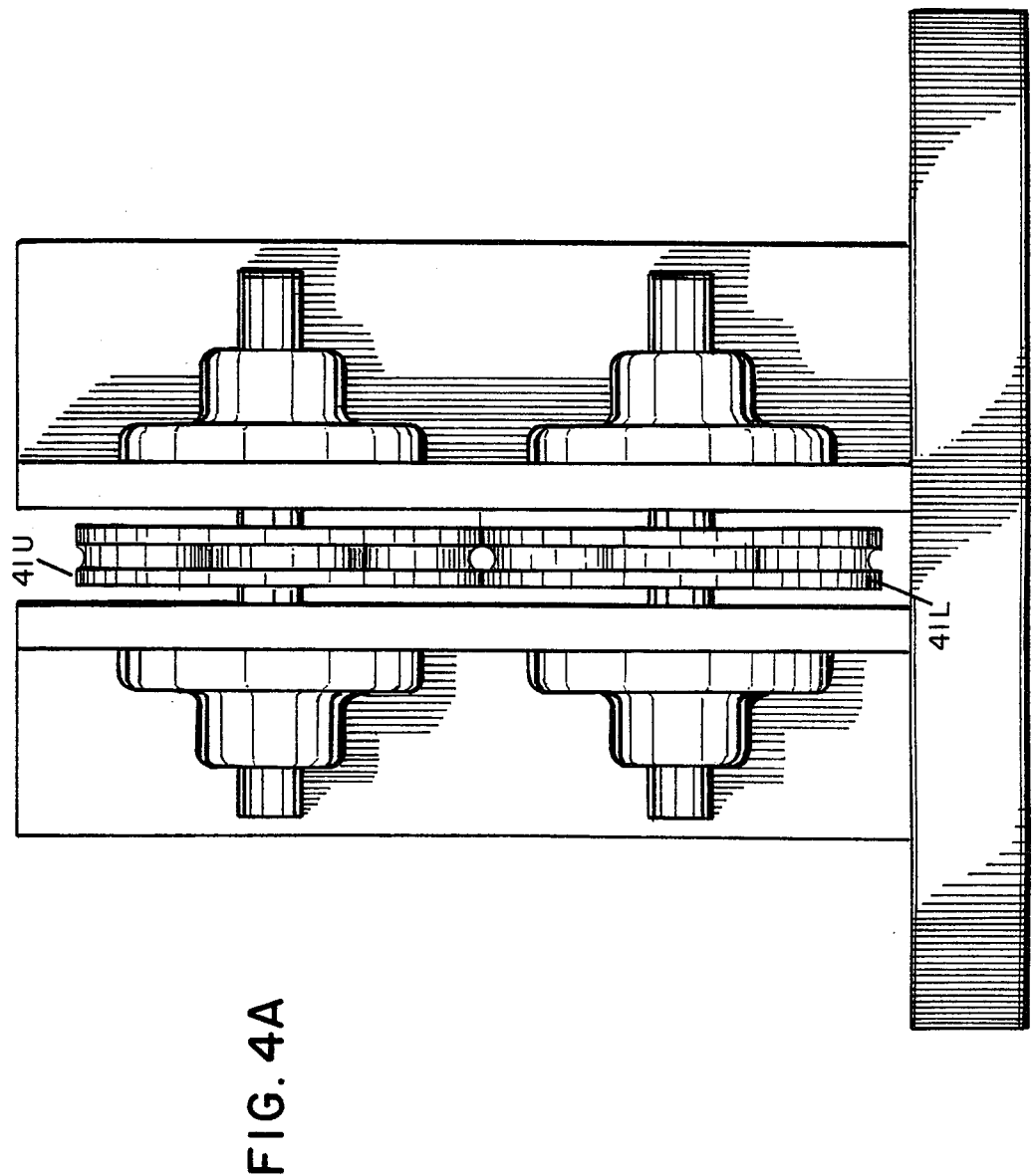
FIGS. 4A and 4B are top and front views, respectively, of apparatus for making the wavy tubing.
Figure 4B:
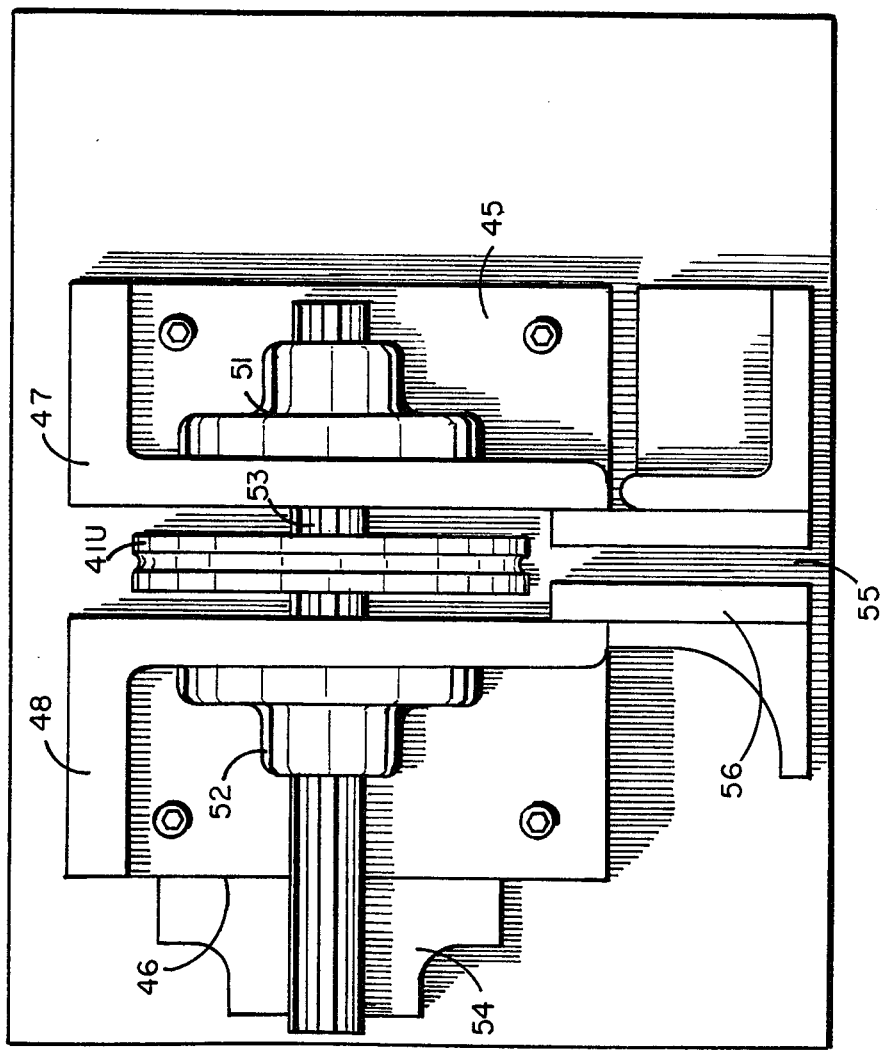

Referring to FIGS. 4A and 4B, there are shown top and front views, respectively, of an embodiment of a mamachine for making wavy tubes according to the invention. Opposed base plates 45 and 46 may be fastened to a suitable work bench and are formed with upstanding L-shaped plates 47 and 48, respectively, carrying flanged bearings 51 and 52, respectively, for supporting upper shaft 53 on which an upper gear 41U is mounted. A similar assembly is supported immediately below. A drive gear 54 is seated on the end of shaft 53 and meshes with a mating gear below so that the upper and lower gears are driven together. Opposed guide plates 55 and 56 guide straight copper tubing between upper gear 41U and lower gear 41L. A length of tubing may then be forced in the region between upper gear 41U and lower gear 41L as these gears are driven in synchronism to produce wavy tubes of the type shown in FIGS. 1 and 2. This apparatus can produce a 20-foot length of ¼" round wavy tubing in approximately a minute.

Figure 5:
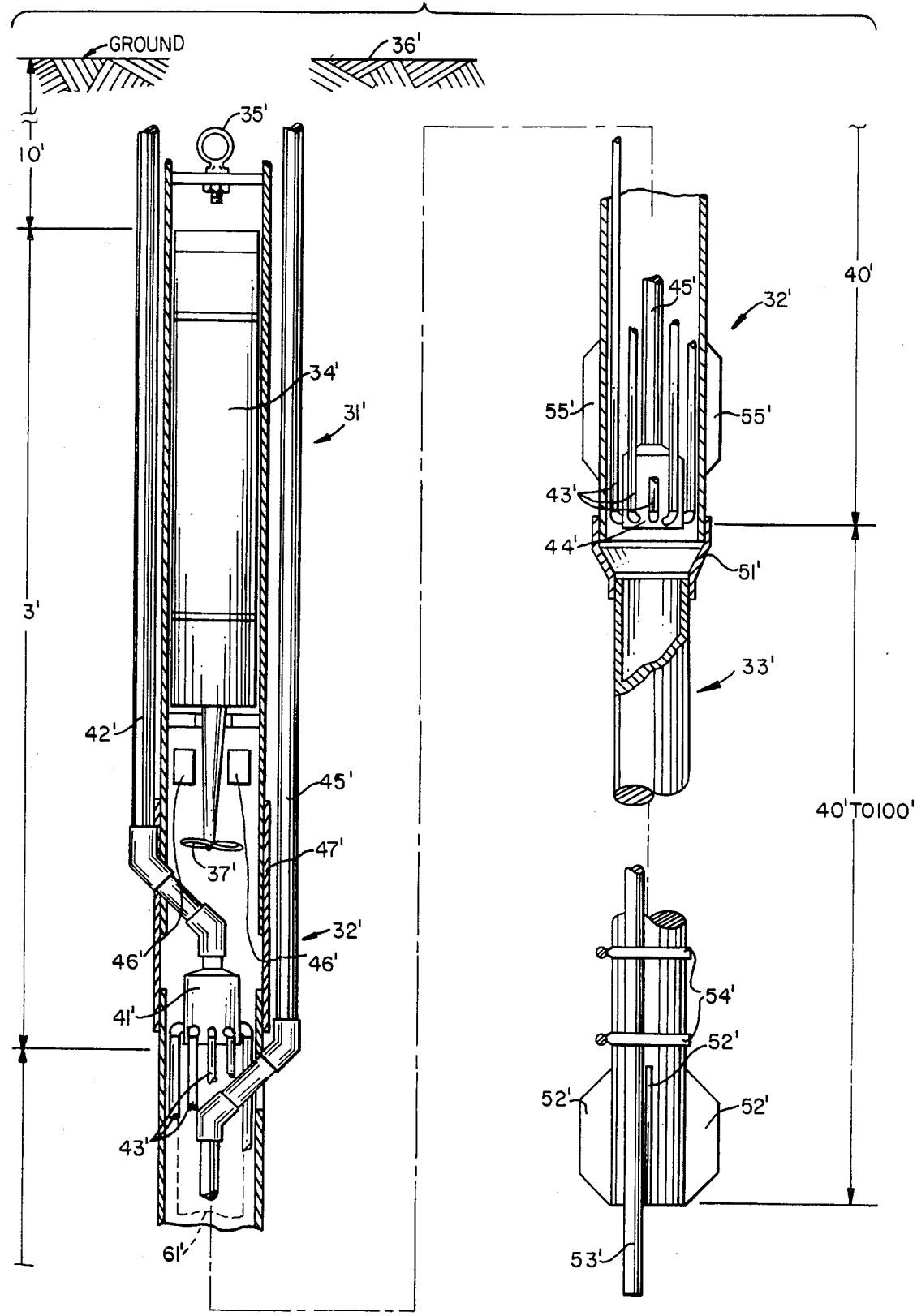
FIG. 5 is a fragmentary axial folded view partially in section of an embodiment of the invention seated in the ground.

Referring to FIG. 5, there is shown a view partially in section with portions cut away and lower portions displaced to the right of the upper portion illustrating an embodiment of the invention especially suitable for insertion in wet underground holes corresponding substantially to the structure shown in FIG. 3 of Application Ser. No. 248,964 filed Mar. 30, 1981.

This embodiment includes an upper section 31', an intermediate section 32' and a lower section 33'. Upper section 31' carries pump motor 34' and depends from an eye-bolt 35' secured to a brass plate 38' that may be used for lowering the structure into and raising it from the hole bored in the ground. The top of pump 34' is typically a few feet below the water level. A propeller 37' depends from pump motor 34' and functions to help keep the ground water circulating to provide effective heat transfer. The intermediate section 32' includes an upper distributor 41', that exchanges freon with pipe 42' and exchanges freon with eight smaller diameter wavy copper tubes such as 43' that are typically forty-feet long and exchange the freon with lower distributor 44'. Distributor 44' exchanges the freon with pipe 45' for exchange with the heat exchanging apparatus in the space to be heated and/or cooled. Intermediate section 32' is formed with slots 46' for admitting water to a level that extends to a height typically just above propeller blade 37'.

Upper section 31' is joined to intermediate section 32' by a support sleeve 47'. Intermediate section 32' is joined to lower section 33' by PVC reducer 51'. The end of lower section 33' carries three guide fins 52' spaced 120° about the axis and a depth limiter rod 53' strapped to lower section 33' by straps 54'. Three PVC guide fins, two of which 55', are visible, are also attached to the lower end of intermediate section 32'. Additional guide fins 52' and 55' not shown should be spaced as needed along the various sections to provide spacing in the hole.

The use of wavy tubes has a number of advantages. Increased heat transfer outside the tube occurs because there are numerous eddies produced in the cross flow as the water flows axially over the waves in the tubes. There is also increased heat transfer inside the tube because of the secondary flow induced by the repeated reverse bends as the Freon flows along the inside of the wavy tube. Making the wavy tube peak-to-peak amplitude of the order of a wavelength not only facilitates heat exchange but also ease of manufacture. The wavelength may preferably be of the order of 5 to 15 times the tube diameter, and typically 9 times the tube outer diameter. Furthermore, the cost for a 40-foot wavy tube heat exchanger is approximately ¼ the cost of the enhanced area tubing for a straight tube heat exchanger of the type described above in connection with the prior invention. The invention thus achieves efficient heat transfer at less cost.

There has been described novel apparatus and techniques for increasing heat transfer and apparatus and techniques for making the wavy tubes which increase the heat transfer. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Geothermal heat transfer apparatus comprising,
   heat exchanging means for orientation in the earth below ground substantially vertically and having a hollow conduit of length from top to bottom much greater than the span across said hollow conduit orthogonal to its length having a top portion near said top, bottom portion near said bottom and an intermediate portion contiguous and communicating with said top and bottom portions for allowing thermally conductive fluid to flow freely between said top, intermediate and bottom portions for immersion in thermally conductive fluid in the region around said heat exchanging means for increasing the heat flow between the latter and earth when inserted into a substantially vertical borehole in the earth with said top portion above said bottom portion,
   said heat exchanging means comprising heat exchanging conduit means in said intermediate portion for carrying refrigerant,
   said heat exchanging conduit means comprising a plurality of tubes of thermally conductive material for carrying said refrigerant and extending along the length of said hollow conduit for a tube length that is less than said length of said hollow conduit,
   said hollow conduit being formed with port means between said top and said plurality of tubes for allowing said thermally conductive fluid to pass in a flow path embracing said plurality of tubes, said bottom portion, an outer channel around said hollow conduit and said port means,
   a thermally conducting tube embracing the axis of said hollow conduit inside said conduit in said intermediate portion for carrying refrigerant,
   said tubes of thermally conductive material being wavy, said tubes of thermally conductive material extending between said conducting tube and said conduit for substantially the entire radial distance therebetween having waves characterized by a wavelength that is greater than the diameter of said tubes and less than the diameter of said conduit and comprising means for creating eddies in fluid moving in an axial direction within said conduit to enhance the heat transfer between said fluid and said tubes and for creating eddies in said refigerant inside said tubes to enhance the heat transfer between said refrigerant and said tubes, and means for intercoupling said conducting tube and said tubes of thermally conductive material to form a refrigerant flow path in a first direction through said thermally conducting tube embracing the axis of said hollow conduit and in a second direction opposite to said first direction through said tubes of thermally conductive material.

2. The improvement in accordance with claim 1 wherein the length of each of said tubes is much greater than the diameter of said conduit.

3. The improvement in accordance with claim 2 wherein the length of each of said tubes is much greater than said wavelength.

4. The improvement in accordance with claim 1 wherein said waves are characterized by a peak-to-peak amplitude that is greater than the diameter of each of said tubes and less than the diameter of said conduit.

* * * * *